US 11,766,915 B2

(12) United States Patent
Hwang et al.

(10) Patent No.: US 11,766,915 B2
(45) Date of Patent: Sep. 26, 2023

(54) HEAT MANAGEMENT SYSTEM

(71) Applicant: Hanon Systems, Daejeon (KR)

(72) Inventors: In-Guk Hwang, Daejeon (KR); Seong Hun Kim, Daejeon (KR); Hae-Jun Lee, Daejeon (KR)

(73) Assignee: Hanon Systems, Daejeon (KR)

( * ) Notice: Subject to any disclaimer, the term of this patent is extended or adjusted under 35 U.S.C. 154(b) by 0 days.

(21) Appl. No.: 17/616,048

(22) PCT Filed: Jun. 3, 2020

(86) PCT No.: PCT/KR2020/007193
§ 371 (c)(1),
(2) Date: Dec. 2, 2021

(87) PCT Pub. No.: WO2020/246792
PCT Pub. Date: Dec. 10, 2020

(65) Prior Publication Data
US 2022/0314737 A1     Oct. 6, 2022

(30) Foreign Application Priority Data

Jun. 3, 2019 (KR) .................. 10-2019-0065365
Jun. 1, 2020 (KR) .................. 10-2020-0065826

(51) Int. Cl.
*B60H 1/00*       (2006.01)
*F01P 5/10*       (2006.01)
(Continued)

(52) U.S. Cl.
CPC ..... *B60H 1/00385* (2013.01); *B60H 1/00278* (2013.01); *F01P 5/10* (2013.01);
(Continued)

(58) Field of Classification Search
CPC ............ B60H 1/00385; B60H 1/00278; B60H 2001/00307; F01P 5/10; F01P 7/14;
(Continued)

(56) References Cited

U.S. PATENT DOCUMENTS

2014/0216689 A1   8/2014   Lombardo et al.
2017/0373359 A1*   12/2017   Krull ................. H01M 10/6567

FOREIGN PATENT DOCUMENTS

KR     20120014672 A     2/2012
KR     20140147365 A     12/2014
(Continued)

OTHER PUBLICATIONS

International Search Report issued in PCT/KR2020/007193 dated Sep. 4, 2020.

*Primary Examiner* — Jacob M Amick
(74) *Attorney, Agent, or Firm* — Norton Rose Fulbright US LLP; James R. Crawford

(57) ABSTRACT

A heat management system includes a reservoir tank which stores a coolant and can replenish, with the coolant, a coolant line connected to the reservoir tank; a flow path transition valve which is connected to the downstream side, according to the flow direction of the coolant, of the reservoir tank and can control the flow direction of the coolant; and a coolant circulation pump which is connected to the downstream side, according to the flow direction of the coolant, of the flow path transition valve and pumps the coolant along the coolant line, wherein, through the layout structure of the reservoir tank, flow path transition valve, and coolant circulation pump, the distance between parts constituting a coolant system of a vehicle is minimized, and the overall flow of the coolant is formed in the direction of gravity, and, thereby, a pressure drop of the coolant can be reduced.

15 Claims, 7 Drawing Sheets

(51) Int. Cl.
  *F01P 11/02* (2006.01)
  *F01P 7/14* (2006.01)
  *F01P 11/04* (2006.01)
(52) U.S. Cl.
  CPC ............... *F01P 7/14* (2013.01); *F01P 11/02* (2013.01); *F01P 11/029* (2013.01); *F01P 11/04* (2013.01); *B60H 2001/00307* (2013.01); *F01P 2007/146* (2013.01)
(58) Field of Classification Search
  CPC ...... F01P 11/02; F01P 11/04; F01P 2007/146; F01P 11/029
  See application file for complete search history.

(56) References Cited

FOREIGN PATENT DOCUMENTS

| | | |
|---|---|---|
| KR | 20180029680 A | 3/2018 |
| KR | 20180045621 A | 5/2018 |
| KR | 20190024811 A | 3/2019 |

\* cited by examiner

HEAT MANAGEMENT SYSTEM

CROSS REFERENCE TO RELATED APPLICATIONS

This application is a national phase under 35 U.S.C. § 371 of International Application No. PCT/KR2020/007193 filed on Jun. 3, 2020, which claims the benefit of priority from Korean Patent Application Nos. 10-2020-0065826 filed on Jun. 1, 2020 and 10-2019-0065365 filed on Jun. 3, 2019. The entire contents of these applications are incorporated herein by reference in their entirety.

TECHNICAL FIELD

The present invention relates to a heat management system in which components constituting a coolant system for heating of a vehicle and cooling and heating of electronic components are modularized.

BACKGROUND ART

Recently, an electric vehicle has become prominent as a solution to implementation of environmentally-friendly technology and a problem such as energy depletion in a vehicle field.

The electric vehicle run using a motor driven by receiving power supplied from a battery or a fuel cell, and thus, emits less carbon and produces less noise. In addition, the electric vehicle is environmentally friendly because it uses a motor having more excellent energy efficiency than an existing engine.

Such an electric vehicle is provided with a heat management system for cooling and heating for interior air conditioning and cooling of electronic components such as a driving motor, a battery, and an inverter.

The heat management system includes a coolant system for interior heating of the vehicle and cooling and heating of the electronic components. However, in the coolant system, the number of components configured in order to circulate a coolant and the number of pipes connecting these components to each other are large, such that a process of assembling the coolant system is complicated and difficult. In addition, lengths of the pipes connecting the components to each other are increased, such that performance loss of the refrigerant system due to a pressure drop of the flowing coolant occurs.

RELATED ART DOCUMENT

Patent Document

KR 2014-0147365 A (2014 Dec. 30)

DISCLOSURE

Technical Problem

An object of the present invention is to provide a heat management system capable of decreasing pressure loss of a coolant in pipes connecting components constituting a coolant system for interior heating of a vehicle and cooling and heating of electronic components to each other, improving performance of the coolant system, and improving assemblability by decreasing a distance between the components.

Technical Solution

In one general aspect, a heat management system includes: a reservoir tank storing a coolant and replenishing a coolant line connected thereto with the coolant; a flow path switching valve connected to a downstream side of the reservoir tank in a flow direction of the coolant and controlling the flow direction of the coolant; and a coolant circulation pump connected to a downstream side of the flow path switching valve in the flow direction of the coolant and pumping the coolant along the coolant line, wherein each of the flow path switching valve and the coolant circulation pump is disposed below the reservoir tank in a height direction and is coupled to the reservoir tank.

A coolant outlet of the reservoir tank and a coolant inlet of the flow path switching valve may be disposed adjacent to each other on the same line.

The flow path switching valve and the coolant circulation pump may be disposed at heights corresponding to each other in the height direction, the flow path switching valve may be disposed on a coolant inlet side of the coolant circulation pump, and a coolant outlet of the flow path switching valve and a coolant inlet of the coolant circulation pump may be disposed adjacent to each other on the same line.

A coolant inlet of the reservoir tank may be formed at an upper side of the reservoir tank in the height direction, and a coolant outlet of the reservoir tank may be formed at a lower side of the reservoir tank in the height direction.

A coolant outlet of the coolant circulation pump may be formed toward a lower side in the height direction.

The flow path switching valve may have one coolant inlet through which the coolant is introduced and two or more coolant outlets through which the coolant is discharged, and a coolant outlet of the reservoir tank and a coolant inlet of the flow path switching valve may be disposed adjacent to each other on the same line, and one coolant outlet of the flow path switching valve and a coolant inlet of the coolant circulation pump may be disposed adjacent to each other on the same line.

The heat management system may further include: a first connection member connecting the coolant outlet of the reservoir tank and the coolant inlet of the flow path switching valve to each other; and a second connection member connecting the one coolant outlet of the flow path switching valve and the coolant inlet of the coolant circulation pump to each other.

The reservoir tank may have a first fixing part and a second fixing part formed at one side thereof in a width direction, the first fixing part being coupled to the flow path switching valve and the second fixing part being coupled to the coolant circulation pump, and the first fixing part and the second fixing part may be formed on the same side surface of the reservoir tank.

The reservoir tank may have a protrusion part formed downward from a lower surface of a body in which the coolant is stored and communicating with the body to accommodate the coolant and have a coolant outlet formed from the protrusion part in a width direction, and the flow path switching valve may be disposed at a height corresponding to the protrusion part of the reservoir tank.

The heat management system may further include a first fastening bracket and a second fastening bracket formed to extend from both sides of the reservoir tank in a length direction and fixing the reservoir tank to a vehicle body.

The heat management system may further include a third fastening bracket coupled to the second fixing part of the reservoir tank, wherein the coolant circulation pump is disposed and fixed between the second fixing part and the third fastening bracket.

The reservoir tank may be connected to a downstream side of a radiator in the flow direction of the coolant.

The other coolant outlet of the flow path switching valve may be connected to an upstream side of a battery side in the flow direction of the coolant.

A coolant outlet of the coolant circulation pump may be connected to one or more of a water-cooled condenser, a heater core, and an electronic component.

Advantageous Effects

In the heat management system according to the present invention, a distance between components constituting a coolant system for interior heating of a vehicle and cooling and heating of electronic components is decreased, such that pressure loss of a coolant in pipes connecting the components to each other may be decreased, performance of the coolant system may be improved, and assemblability of the components constituting the coolant system may be improved.

BEST MODE

Hereinafter, a heat management system according to the present invention having the configuration as described above will be described in detail with reference to the accompanying drawings.

Figure 1:
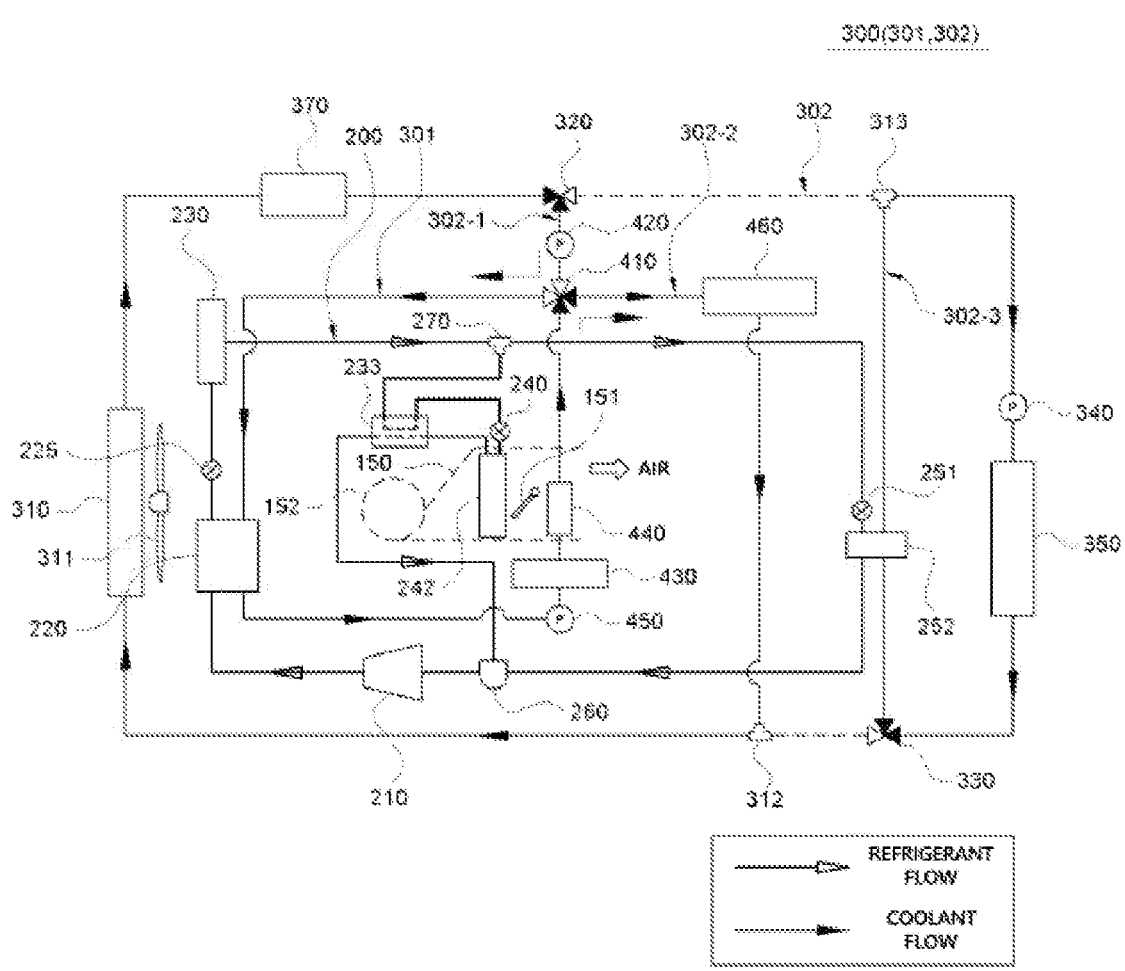
FIG. 1 is a configuration diagram illustrating an entire heat management system including a coolant system and a refrigerant system according to an embodiment of the present invention.
Figure 2:
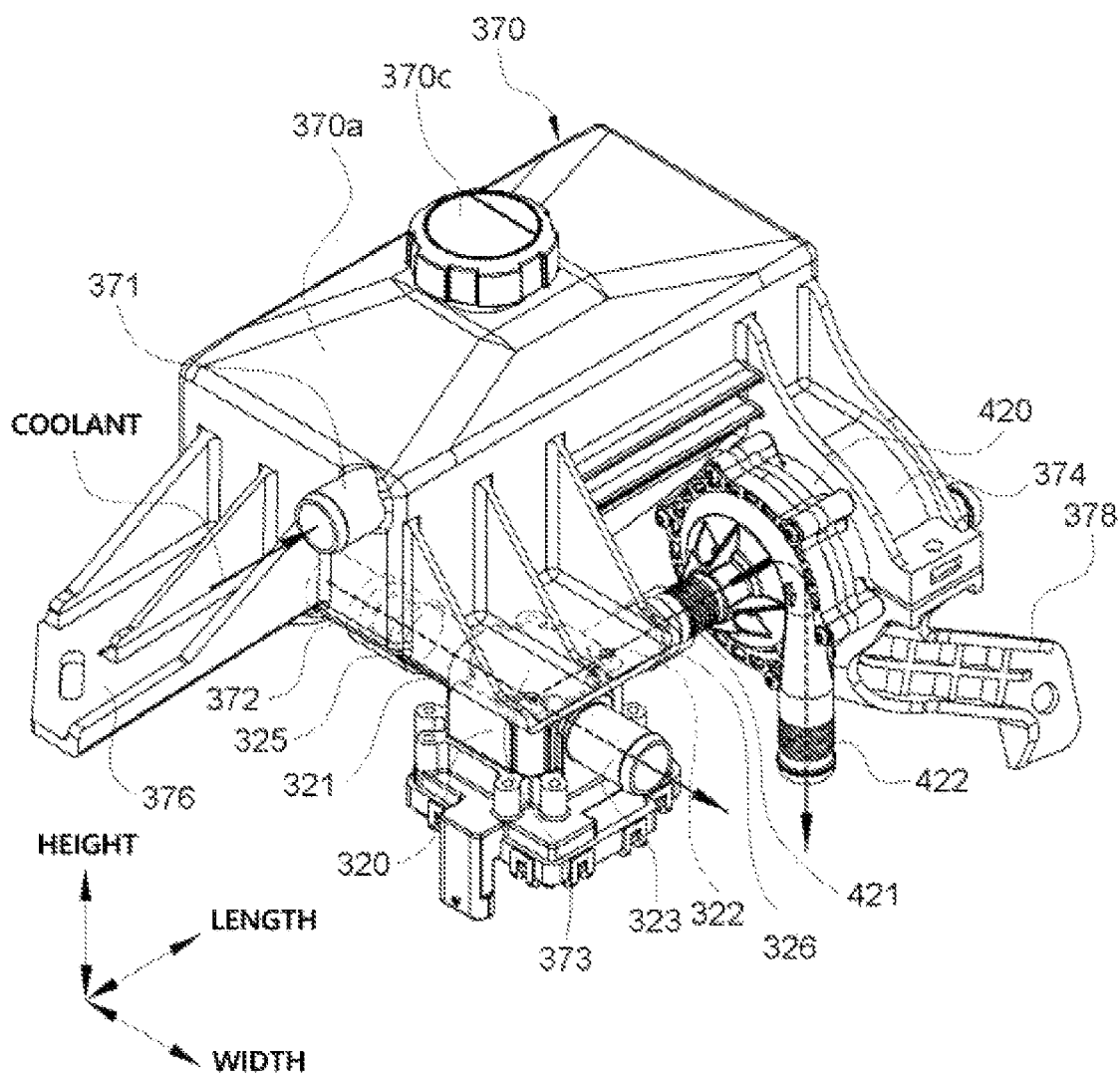
FIGS. 2 to 4 are an assembled perspective view and an exploded perspective view illustrating the heat management system according to an embodiment of the present invention.
Figure 3:
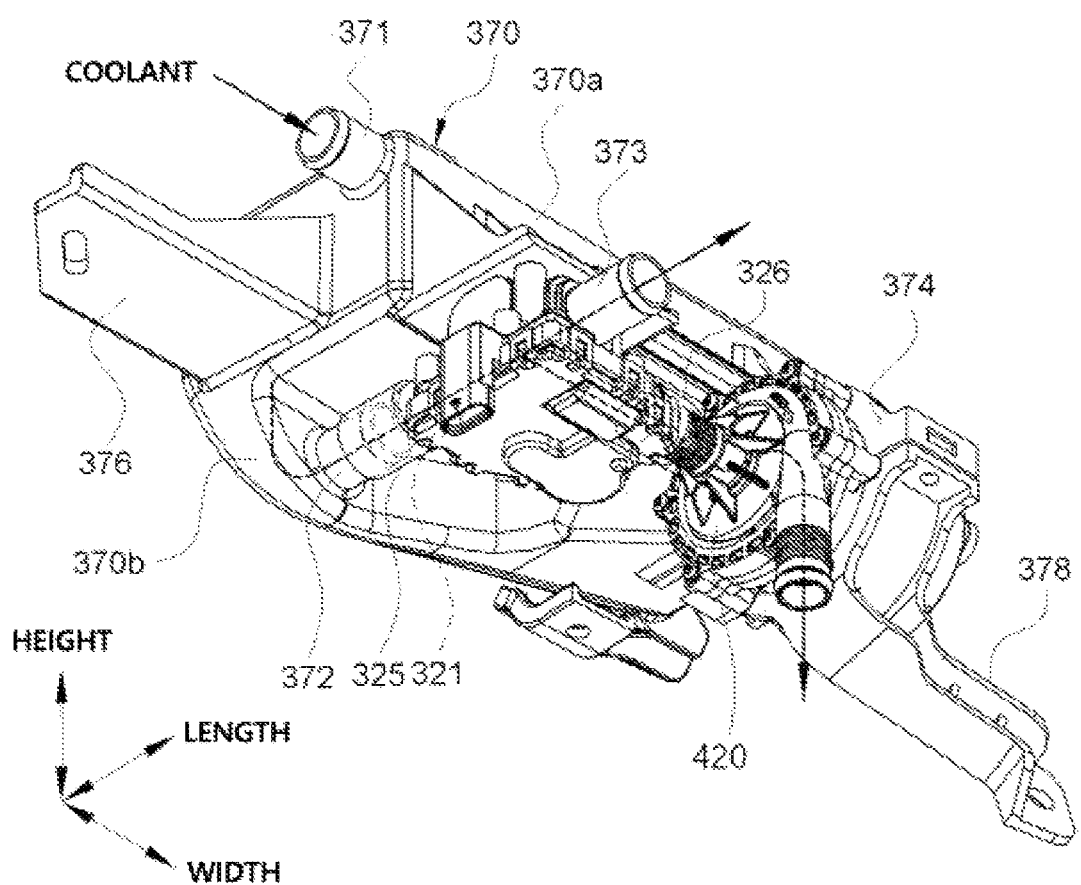
Figure 4:
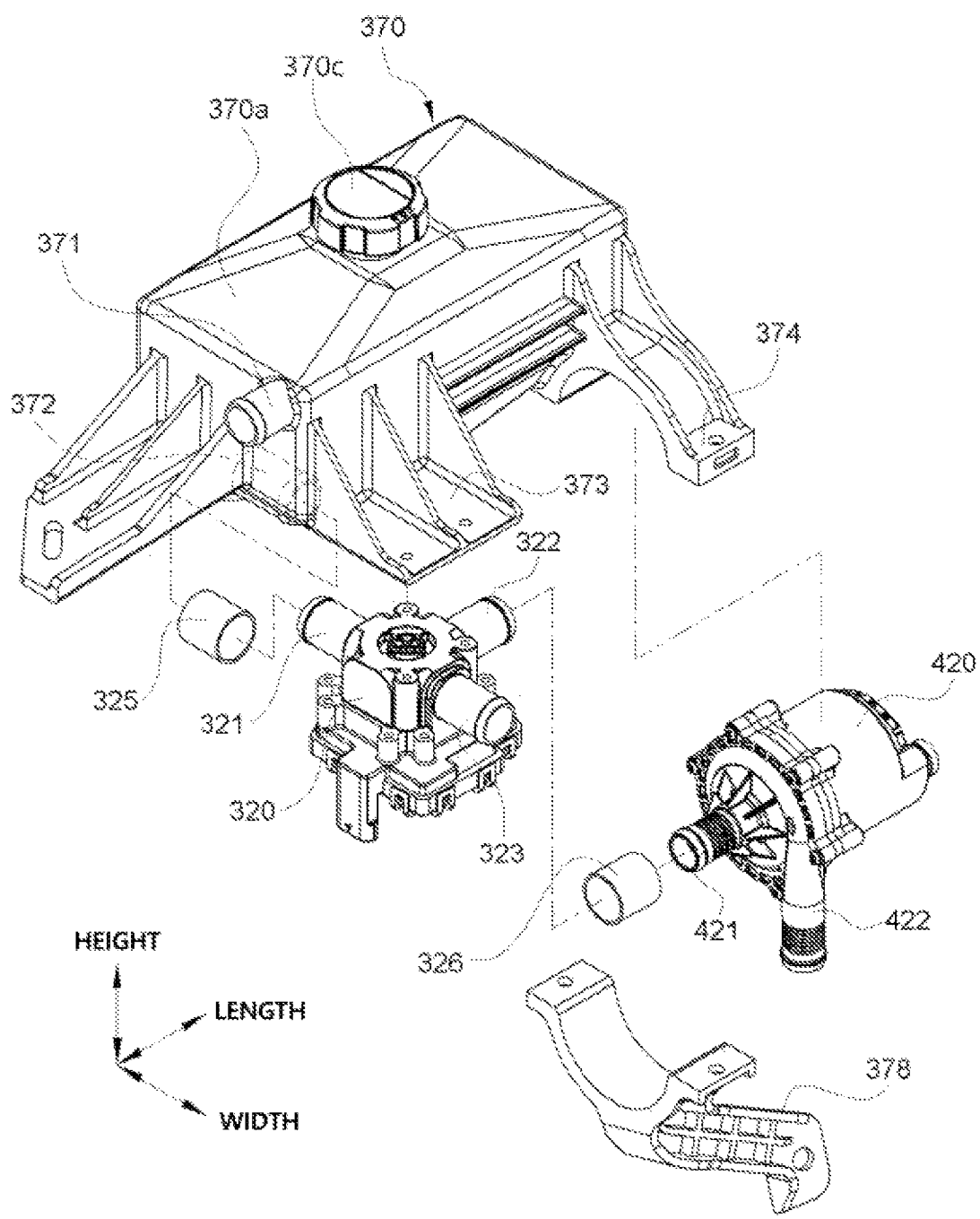
Figure 5:
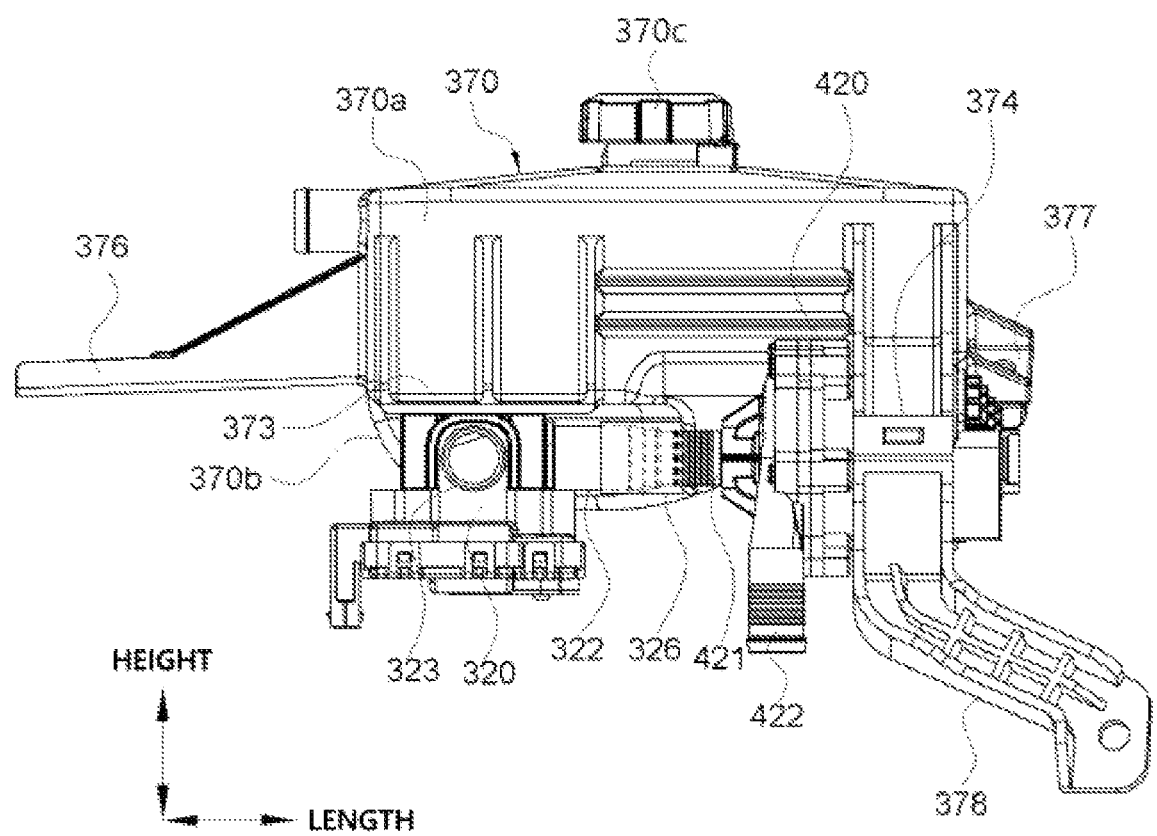
FIGS. 5 to 7 are, respectively, a front view, a left view, and a right view illustrating the heat management system according to an embodiment of the present invention.
Figure 6:
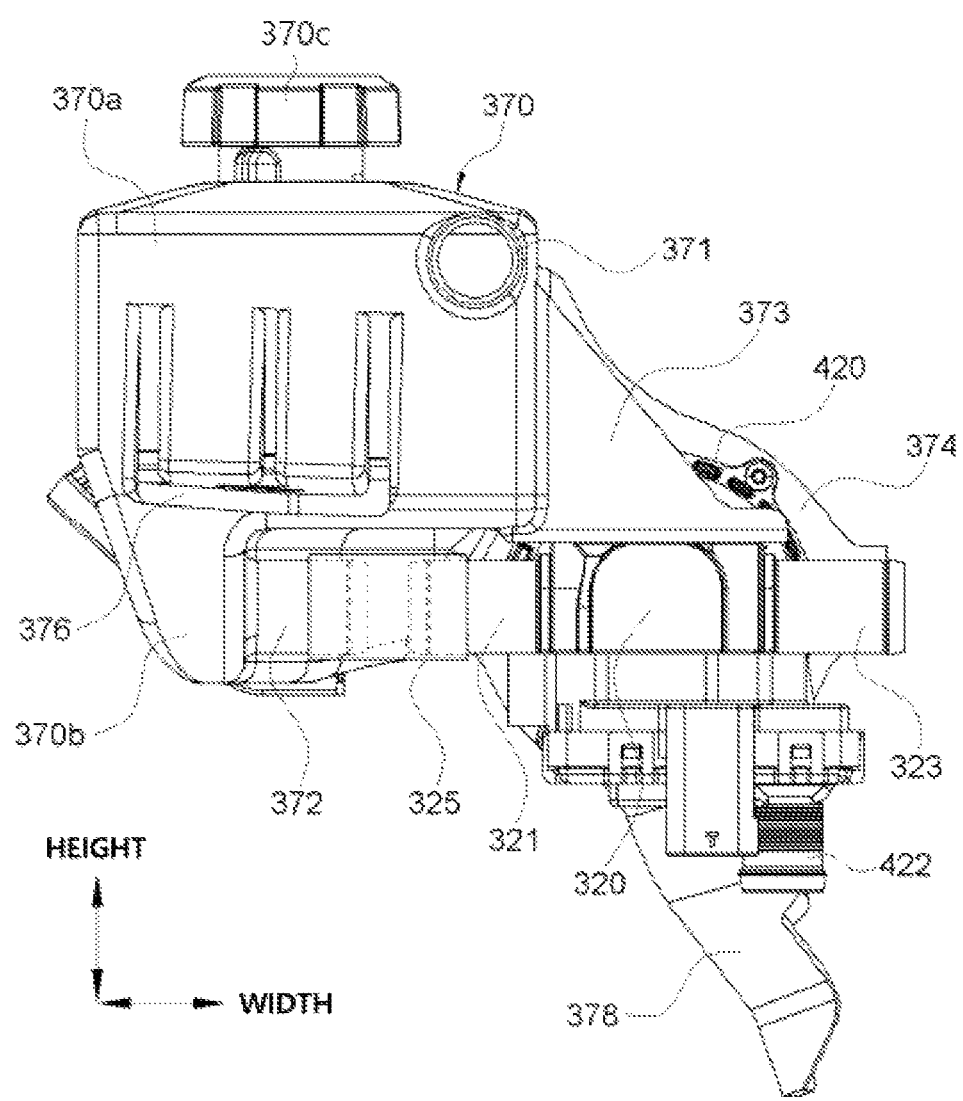
Figure 7:
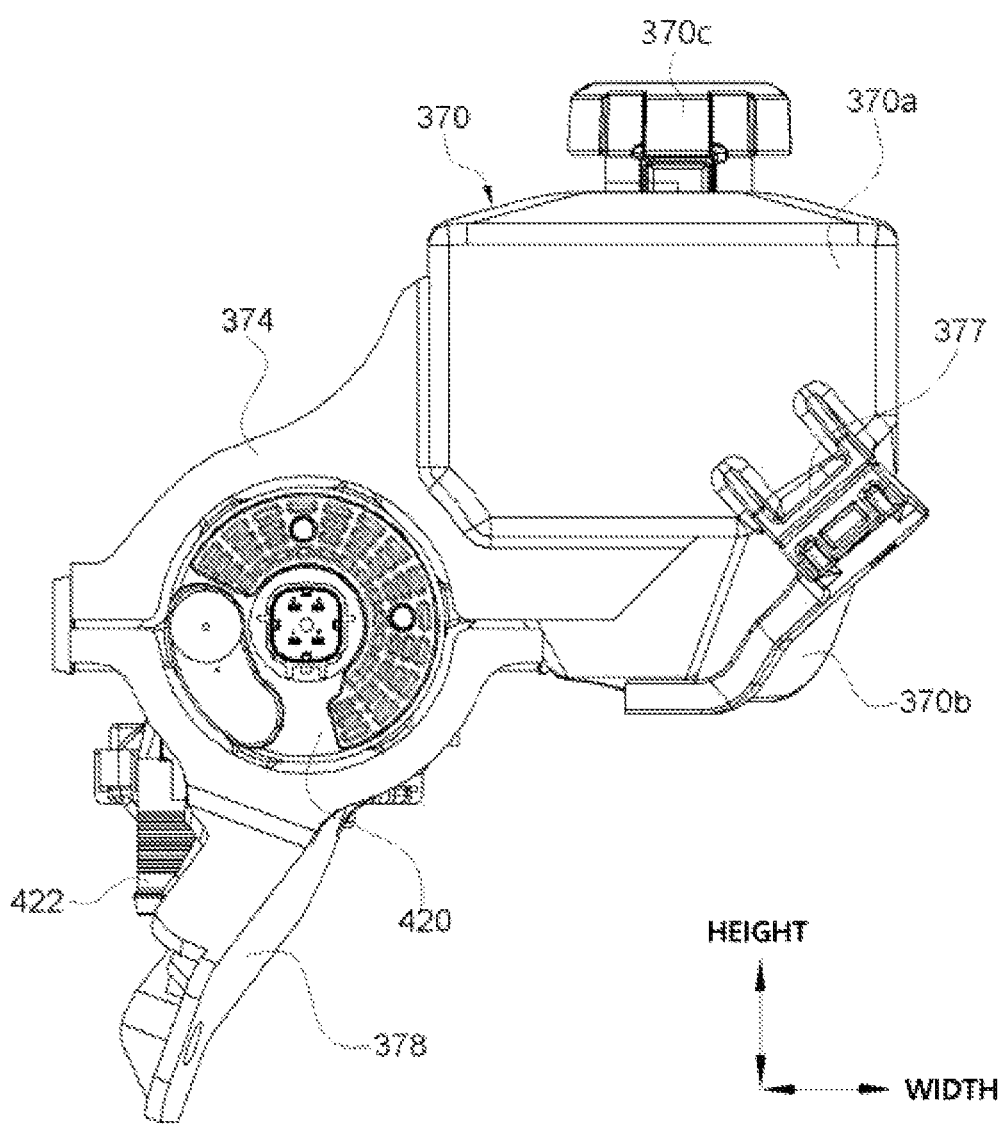

FIG. 1 is a configuration diagram illustrating an entire heat management system including a coolant system and a refrigerant system according to an embodiment of the present invention, FIGS. 2 to 4 are an assembled perspective view and an exploded perspective view illustrating the heat management system according to an embodiment of the present invention, and FIGS. 5 to 7 are, respectively, a front view, a left view, and a right view illustrating the heat management system according to an embodiment of the present invention.

Referring to FIG. 1, the heat management system according to the present invention may be configured to mainly include a reservoir tank 370, a flow path switching valve 320, and a coolant circulation pump 420.

The reservoir tank 370 may serve to store a coolant introduced from a radiator 310, which is a heat exchanger cooling the coolant, and replenish a coolant line connected to the reservoir tank 370 with the coolant, and may be connected to a downstream side of the radiator 310 in a flow direction of the coolant.

The flow path switching valve may be a second directional selector valve 320, and the second directional selector valve 320 may be connected to a downstream side of the reservoir tank 370 in the flow direction of the coolant. In addition, as an example, the second directional selector valve 320 may have one coolant inlet through which the coolant is introduced and two coolant outlets through which the coolant is discharged. Therefore, the second directional selector valve 320 may control a flow direction of the coolant introduced thereinto to allow the coolant inlet to selectively communicate with any one of the two coolant outlets or block a flow of the coolant from the coolant inlet to both the coolant outlets.

The coolant circulation pump is a pump pumping the coolant along the coolant line, and may be a second coolant pump 420. In addition, the second coolant pump 420 may be connected to a downstream side of the second directional selector valve 320, which is the flow path switching valve, in the flow direction of the coolant. In addition, as an example, the second coolant pump 420 may be connected to one of the two coolant outlets of the second directional selector valve 320, and the other of the two coolant outlets of the second directional selector valve 320 may be connected to an upstream side of a battery 350 side. Here, the battery 350 side may be a cooling system configured so that the coolant is sequentially circulated through a battery 350, a battery chiller 252, and a third coolant pump 340, and as an example, the other of the two coolant outlets of the second directional selector valve 320 may be connected to a downstream side of the battery chiller 252 and an upstream side of the third coolant pump 340 in the flow direction of the coolant. In addition, as an example, a coolant outlet of the second coolant pump 420 is connected to a first directional selector valve 410 to which all of a water-cooled condenser 220, a heater core 440, and an electronic component 460 are connected, such that the coolant discharged from the coolant outlet of the second coolant pump 420 may be controlled to sequentially pass through the water-cooled condenser 220, the heater core 440, and the electronic component 460 by an operation of the first directional selector valve 410. Alternatively, the coolant discharged from the coolant outlet of the second coolant pump 420 may be controlled to pass through the electronic component 460 without passing through the water-cooled condenser 220 and the heater core 440 by an operation of the first directional selector valve 410.

Here, the reservoir tank 370 has an inlet pipe 371, which is a coolant inlet, formed at an upper side thereof in a height direction, and an outlet pipe 372, which is a coolant outlet, formed toward a lower side thereof in the height direction, and each of the second directional selector valve 320, which is the flow path switching valve, and the second coolant pump 420, which is the coolant circulation pump, may be disposed below the reservoir tank 370 in the height direction and be coupled and fixed to the reservoir tank 370. In addition, the second directional selector valve 320 and the second coolant pump 420 may be disposed at heights corresponding to each other in the height direction, and the second directional selector valve 320 may be disposed on a coolant inlet side of the second coolant pump 420. That is, the coolant discharged from the radiator 310 may be introduced into an upper portion of the reservoir tank 370 along a direction of gravity and be discharged to a lower portion of the reservoir tank 370, the coolant discharged from the reservoir tank 370 may be introduced into the second coolant pump 420 disposed at a height corresponding to that of the second directional selector valve 320 through the second directional selector valve 320, and the coolant introduced into the second directional selector valve 320 may be discharged toward a lower portion of the second coolant pump 420, which is the direction of gravity.

Accordingly, in the heat management system according to the present invention, a distance between components constituting the coolant system for interior heating of a vehicle and cooling and heating of electronic components is decreased, such that pressure loss of the coolant in pipes connecting the components to each other may be decreased and performance of the coolant system may be improved. In addition, since the components are disposed so that a coolant flow is formed in the direction of gravity is formed, pressure loss of the coolant may be decreased and performance of the coolant system may be improved.

In addition, the outlet pipe 372, which is the coolant outlet of the reservoir tank 370, and an inlet pipe 321, which is the coolant inlet of the second directional selector valve 320, may be disposed adjacent to each other on the same line, and the outlet pipe 372 of the reservoir tank 370 and the inlet pipe 321 of the second directional selector valve 320 may be connected to and communicate with each other by a first connection member 325.

In addition, a first outlet pipe 322, which is the coolant outlet of the second directional selector valve 320, and an inlet pipe 421, which is a coolant inlet of the second coolant pump 420, may be disposed adjacent to each other on the same line, and the first outlet pipe 322 of the second directional selector valve 320 and the inlet pipe 421 of the second coolant pump 420 may be connected to and communicate with each other by a second connection member 326.

Therefore, a length of a coolant flow path between the reservoir tank 370 and the second directional selector valve 320 is minimized, and a length of a coolant flow path between the second directional selector valve 320 and the second coolant pump 420 is minimized, such that a pressure drop of the flowing coolant may be decreased and the coolant may be smoothly pumped, and thus, power consumption of the coolant pump may also be decreased.

In addition, the heat management system according to an embodiment of the present invention may be configured to mainly include a coolant system 300 heating an interior and cooling and heating components by circulating a coolant, and a refrigerant system 200 cooling the interior by circulating a refrigerant. In addition, the coolant system 300 may include a heating line 301 for interior heating and a cooling line 302 for cooling and heating the electronic component 460 and the battery 350.

Here, the heating line 301 of the coolant system 300 according to the present invention may include the water-cooled condenser 220, a first coolant pump 450, a coolant heater 430, the heater core 440, and the first directional selector valve 410.

The refrigerant and the coolant may exchange heat with each other while passing through the water-cooled condenser 220. The first coolant pump 450 is a means pumping the coolant so that the coolant is circulated along the heating line 301, and may be disposed on a downstream side of the water-cooled condenser 220 in the flow direction of the coolant and be installed on a coolant line. The coolant heater 430 is a device heating the coolant, and may be disposed on and connected to a downstream side of the first coolant pump 450 and an upstream side of the heater core 440 in the flow direction of the coolant. The heater core 440 may be disposed in an air conditioner 150 of the vehicle, and may be disposed on and connected to a downstream side of the coolant heater 430 in the flow direction of the coolant. The first directional selector valve 410 may be installed between the heater core 440 and the water-cooled condenser 220, and may be configured to selectively connect the heating line 301 and a cooling line 302 to be described later to each other or block the connection between the heating line 301 and the cooling line 302. In more detail, the first directional selector valve 410 may be installed on the heating line 301, two coolant line pipes may be connected to the first directional selector valve 410, one first connection line 302-1 branched from one side of the cooling line 302 may be connected to the first directional selector valve 410, and one second connection line 302-2 branched from the other side of the cooling line 302 may be connected to the first directional selector valve 410 That is, at the first directional selector valve 410, four coolant lines may be connected to each other so as to meet, and the first directional selector valve 410 may be a four-way selector valve capable of controlling a state in which the four coolant lines are connected to each other or the connection between the four coolant lines is blocked.

In addition, in the coolant system 300, the cooling line 302 may include the radiator 310, the reservoir tank 370, the flow path switching valve 320, the coolant circulation pump 420, the first directional selector valve 410, the electronic component 460, a first coolant joint 313, a second coolant joint 312, the third coolant pump 340, the battery 350, the battery chiller 252, and a third directional selector valve 330. The radiator 310 is a heat exchanger cooling the coolant heat-exchanged with the electronic component 460 or the battery 350, and may be cooled in an air-cooled manner by a cooling fan 311. The reservoir tank 370 may serve to store the coolant and replenish the coolant line in which the coolant is insufficient with the coolant, and may be installed on a coolant line of an upstream side of the coolant circulation pump 420 and the third coolant pump 340 in the flow direction of the coolant. Here, the flow path switching valve 320 according to the present invention may be the second directional selector valve 320, and the coolant circulation pump 420 may be the second coolant pump 420. The second directional selector valve 320 may be installed on the cooling line 302, two coolant pipes may be connected to the second directional selector valve 320, and the first directional selector valve 410 and the second directional selector valve 320 may be connected to each other by the first connection line 302-1 so that the heating line 301 and the cooling line 302 are connected to each other. That is, at the second directional selector valve 320, three coolant lines may be connected to each other so as to meet, and the second directional selector valve 320 may be a three-way selector valve capable of controlling a state in which the three coolant lines are connected to each other or the connection between the three coolant lines is blocked. The second coolant pump 420 is a means pumping the coolant so that the coolant is circulated along the cooling line 302. In addition, the second coolant pump 420 may be installed on the first connection line 302-1 between the first directional selector valve 410 and the second directional selector valve 320, and the coolant may flow from the second directional selector valve 320 toward the first directional selector valve 410 by an operation of the second coolant pump 420. The first directional selector valve 410 is the same as described in the above-described heating line 301. The electronic component 460 may be disposed on the second connection line 302-2 connecting the first directional selector valve 410 and the second coolant joint 312 to each other, and may be cooled by the coolant. In addition, the electronic component 460 may be a driving motor, an inverter, an on-board charger (OBC), or the like. The third coolant pump 340 is a means pumping the coolant so that the coolant is circulated along the cooling line 302. In addition, the third coolant pump 340 is installed in a coolant line between the first coolant joint 313 and the battery 350, and the coolant may flow from the third coolant pump 340 toward the battery 350. The battery 350 is a power source of the vehicle, and may be a driving source of various electronic components 460 in the vehicle. Alternatively, the battery 350 may serve to store electricity by being connected to a fuel cell or may serve to store electricity supplied from the outside. In addition, the battery 350 may be disposed on a coolant line between the third coolant pump 340 and the third directional selector valve 330. Therefore, the battery 350 may be cooled or heated by exchanging heat with the flowing coolant. The first coolant joint 313 is installed on a coolant line of a downstream side of the second directional selector valve 320 in the flow direction of the coolant, and at the first coolant joint 313, three coolant lines are connected to each other so as to meet. That is, the first coolant joint 313 is installed so that both sides thereof are connected to the cooling line 302, and a third connection line 302-3 may be connected to a lower side of the first coolant joint 313. Here, the third connection line 302-3 may be connected to the first coolant joint 313 so as to pass through the battery chiller 252. The second coolant joint 312 may be installed at a point where a rear end of the second connection line 302-2 meets the cooling line 302, and at the second coolant joint 312, three coolant lines are connected to each other so as to meet. That is, the second coolant joint 312 is installed so that both sides thereof are connected to the cooling line 302, and the second connection line 302-2 may be connected to an upper side of the second coolant joint 312. The battery chiller 252 is the same as described in the above-described heating line 301. The third directional selector valve 330 is installed on a coolant line between the battery 350 and the second coolant joint 312, two coolant pipes are connected to the third directional selector valve 330, and the third connection line 302-3 is connected to an upper side of the third directional selector valve 330, such that the battery 350 and the third connection line 302-3 may be configured to be connected to each other in parallel. In this case, the second directional selector valve 320 may be a three-way selector valve capable of controlling a state in which three coolant lines are connected to each other or the connection between the three coolant lines is blocked.

In addition, the refrigerant system 200 may include a compressor 210, the water-cooled condenser 220, a first expansion valve 225, an air-cooled condenser 230, a first connection block 270, a second expansion valve 240, an evaporator 242, a refrigerant heat exchanger 233, an accumulator 260, a third expansion valve 251, and the battery chiller 252.

The compressor 210 may be an electric compressor driven by receiving power, and serves to suck and compress the refrigerant and discharge the compressed refrigerant toward the water-cooled condenser 220. The water-cooled condenser 220 serves to heat-exchange the refrigerant discharged from the compressor 210 with the coolant to condense the refrigerant as a liquid-phase refrigerant and send the liquid-phase refrigerant to the first expansion valve 225. The first expansion valve 225 may serve to throttle and expand the refrigerant, bypass the refrigerant, or block a flow of the refrigerant, and may be disposed on a downstream side of the water-cooled condenser 220 in a flow direction of the refrigerant. The air-cooled condenser 230 may serve as a condenser or an evaporator, and a function of the air-cooled condenser 230 may vary according to a role of the first expansion valve 225. That is, in a case where the refrigerant system 200 is used as an air conditioner loop, the first expansion valve 225 is completely opened to allow the refrigerant to pass therethrough, and the air-cooled condenser 230 serves as a condenser together with the water-cooled condenser 220, and in a case where the refrigerant system 200 is used as a heat pump loop, the first expansion valve 225 throttles the refrigerant, and the air-cooled condenser 230 serves as an evaporator. In addition, the air-cooled condenser 230 may be cooled or heated in an air-cooled manner by the external air. The first connection block 270 may be formed on a downstream side of the air-cooled condenser 230 in the flow direction of the refrigerant and has a first port, a second port, and a third port formed therein, and these three ports communicate with each other through a flow path passing through the first connection block. Therefore, a refrigerant line may be branched into two refrigerant lines in the first connection block 270, one refrigerant line may be configured to be connected to the evaporator 242, and the other refrigerant line may be configured to be connected to the battery chiller 252. The second expansion valve 240 and the third expansion valve 251 may serve to throttle or pass the refrigerant or block a flow of the refrigerant. In addition, the second expansion valve 240 and the third expansion valve 251 may be configured in parallel with each other. That is, the second expansion valve 240 may be connected to one of the two refrigerant lines branched in the first connection block 270 and the third expansion valve 251 is connected to the other of the two refrigerant lines. In this case, the second expansion valve 240 may be disposed on an upstream side of the evaporator 242 in the flow direction of the refrigerant, and the third expansion valve 251 may be disposed on an upstream side of the battery chiller 252. The evaporator 242 is disposed on a downstream side of the second expansion valve 240 in the flow direction of the refrigerant, and is provided inside the air conditioner 150 of the vehicle, and air flowing by a blower 152 of the air conditioner may be cooled while passing through the evaporator 242 and supplied to the interior of the vehicle to be used for interior cooling of the vehicle. The refrigerant heat exchanger 233 serves to exchange heat between the refrigerant introduced into the second expansion valve 240 and the refrigerant discharged from the evaporator 242 to improve cooling performance. Here, the refrigerant heat exchanger 233 is configured so that the refrigerant line connecting the first connection block 270 and the second expansion valve 240 to each other passes therethrough and the refrigerant line connecting the evaporator 242 and the accumulator 260 to each other passes therethrough, such that heat exchange between the refrigerant before being introduced into the second expansion valve 240 and the refrigerant after passing through the evaporator 242 may occur in the refrigerant heat exchanger 233. Therefore, the refrigerant may be further cooled before being introduced into the second expansion valve 240, cooling performance through the evaporator 242 may be improved, and efficiency of the refrigerant system may be improved, by the refrigerant heat exchanger 233. The battery chiller 252 may be disposed on a downstream side of the third expansion valve 251 in the flow direction of the refrigerant, and may exchange heat with the coolant to cool the coolant. Therefore, the second expansion valve 240 and the evaporator 242 form one set, and the third expansion valve 251 and the battery chiller 252 form another set, such that two sets are configured in parallel on the refrigerant lines. In addition, the refrigerant lines may be joined to downstream sides of the evaporator 242 and the battery chiller 252 in the flow direction of the refrigerant to be formed as a single coolant line. The accumulator 260 may separate the refrigerant into a liquid-phase refrigerant and a gas-phase refrigerant, and supply only the gas-phase refrigerant to the compressor 210. Here, the accumulator 260 may be disposed at and connected to a point where refrigerant lines on a rear side of the evaporator 242 and the downstream side of the battery chiller 252 join, and may be disposed on an upstream side of the compressor 210 in the flow direction of the refrigerant.

In addition, the air conditioner 150 has the blower 152 installed on one side thereof so as to blow air, and a temperature control door 151 may be installed inside the air conditioner 150. In addition, the evaporator 242 and the heater core 440 disposed in the air conditioner may be disposed and configured so that the air discharged from the blower 152 may pass through only the evaporator 242 according and be then introduced into the interior or pass through the evaporator 242, pass through the heater core 440, and be then introduced into the interior, to an operation of the temperature control door 151.

Hereinafter, a configuration of the coolant system according to an embodiment of the present invention described above will be described in more detail.

As illustrated in the drawings, the coolant system according to an embodiment of the present invention may include the reservoir tank 370, the flow path switching valve 320, and the coolant circulation pump 420. In addition, the coolant system according to the present invention may include the first connection member 325 connecting the outlet pipe 372 of the reservoir tank 370 and the inlet pipe 321 of the flow path switching valve 320 to each other and the second connection member 326 connecting the first outlet pipe 322 of the flow path switching valve 320 and the inlet pipe 421 of the coolant circulation pump 420 to each other.

The reservoir tank 370 may include a body 370a formed in a rectangular parallelepiped shape and a protrusion part 370b protruding downward from a lower surface of the body 370a in the height direction, and the protrusion part 370b may be formed in a shape in which a portion of a lower surface of a rear side of the body 370a in a width direction protrudes. In addition, the body 370a and the protrusion part 370b may be formed in a shape in which inner portions thereof are empty so that the coolant may be accommodated therein, and may be formed so that empty spaces of the inner portions communicate with each other. In addition, the inlet pipe 371 through which the coolant is introduced may be formed on a left side surface of the body 370a in a length direction so as to extend leftward in the length direction, the outlet pipe 372 through which the coolant is discharged may be formed on a front surface of the protrusion part 370b in the width direction so as to extend forward in the width direction, and the outlet pipe 372 may be formed on a left side in the length direction on the front surface of the protrusion part 370b in the width direction. In addition, the reservoir tank 370 may have an injection port which is formed at an upper side of the body 370a and through which a fluid may be injected, and a stopper 370c may be coupled to the injection port so as to be able to open and close the injection port.

In addition, a first fixing part 373 and a second fixing part 374 may be formed on a front surface of the reservoir tank 370 in the width direction so as to protrude forward in the width direction. That is, the first fixing part 373 and the second fixing part 374 may be formed on the same side surface of the reservoir tank 370. In this case, the first fixing part 373 and the second fixing part 374 may be spaced apart from each other in the length direction, the first fixing part 373 may be formed on the left side in the length direction and be formed at a position corresponding to the outlet pipe 372 of the reservoir tank 370 in the length direction, and the second fixing part 373 may be formed on the right side in the length direction. Here, the body 370a, the protrusion part 370b, the inlet pipe 371, the outlet pipe 372, the first fixing part 373, and the second fixing part 374 of the reservoir tank 370 may be formed integrally with each other using the same material to be seamlessly formed. Alternatively, the body 370a and the protrusion part 370b may be formed of the same material, and one or more of the inlet pipe 371, the outlet pipe 372, the first fixing part 373, and the second fixing part 374 may be formed of a material different from that of the body 370a and the protrusion part 370b and be formed integrally with each other. In addition, the reservoir tank 370 may be variously formed.

The flow path switching valve 320 may be a three-way selector valve in which the inlet pipe 321 through which the coolant is introduced and the first outlet pipe 322 and a second outlet pipe 323 through which the coolant is discharged are formed, the inlet pipe 321 and the first and second outlet pipes 322 and 323 communicate with each other through an internal flow path, and a state in which the inlet pipe 321 is connected to the first and second outlet pipes 322 and 323 or the connection between the inlet pipe 321 and the first and second outlet pipes 322 and 323 is blocked may be controlled. In addition, the flow path switching valve 320 may be disposed below the first fixing part 373 of the reservoir tank 370 in the height direction, and an upper surface of the flow path switching valve 320 may be coupled to a lower surface of the first fixing part 373 in a state in which it is in close contact with the lower surface of the first fixing part 373, such that the flow path switching valve 320 may be fixed to the first fixing part 373 by a fastening means or the like. As an example, as illustrated in the drawings, through holes penetrating through the first fixing part 373 in a vertical direction are formed in the first fixing part 373, female screw threads are formed in the flow path switching valve 320, and male thread portions of bolts pass through the through holes and are then fastened to the female screw threads, such that the flow path switching valve 320 may be coupled to the first fixing part 373.

In addition, the flow path switching valve 320 may be disposed at a height corresponding to the protrusion part 370b of the reservoir tank 370, and the inlet pipe 321 of the flow path switching valve 320 may be formed to protrude from a rear surface of the flow path switching valve 320 in the width direction and may be disposed adjacent to the outlet pipe 372 of the reservoir tank 370 on the same line as the outlet pipe 372 of the reservoir tank 370. Therefore, one side of the first connection member 325 may be connected to the outlet pipe 372 of the reservoir tank 370 and the other side of the first connection member 325 may be connected to the inlet pipe 321 of the flow path switching valve 320. Here, the first connection member 325 may be a flexible hose or the like for easy connection. In addition, the first outlet pipe 322 of the flow path switching valve 320 may be formed to protrude from a right side surface of the flow path switching valve 320 in the length direction rightward, and the second outlet pipe 323 of the flow path switching valve 320 may be formed to protrude from a lower surface of the flow path switching valve 320 in the height direction downward.

The coolant circulation pump 420 is a means capable of pumping the coolant. In addition, the coolant circulation pump 420 may have the inlet pipe 421 through which the coolant is introduced and an outlet pipe 422 through which the coolant is discharged after a pressure of the coolant is raised. The coolant circulation pump 420 may be disposed below the second fixing part 374 of the reservoir tank 370 in the height direction, and an upper surface of the coolant circulation pump 420 may be coupled to the lower surface of the second fixing part 374 in a state in which it is in close contact with the lower surface of the second fixing part 374, such that the flow path switching valve 320 may be fixed to the first fixing part 373 by a fastening means or the like. As an example, as illustrated in the drawings, since the coolant circulation pump 420 has a body formed in a generally cylindrical shape, the lower surface of the second fixing part 374 is formed in an upward concave shape, such that the coolant circulation pump 420 may be placed in a concave portion. In this state, a third fastening bracket 378 having a shape in which an upper surface thereof is downward concave is coupled to the second fixing part 374 by a fastening means such as a bolt, such that the coolant circulation pump 420 may be disposed and fixed between the second fixing part 374 and the third fastening bracket 378.

In addition, the inlet pipe 421 of the coolant circulation pump 420 is formed to protrude from a left side surface of the coolant circulation pump 420 in the length direction, such that the first outlet pipe 322 of the flow path switching valve 320 and the inlet pipe 421 of the coolant circulation pump 420 may be disposed adjacent to each other on the same line. Therefore, one side of the second connection member 326 may be connected to the first outlet pipe 322 of the flow path switching valve 320, and the other side of the second connection member 326 may be connected to the inlet pipe 421 of the coolant circulation pump 420. Here, the second connection member 326 may also be a flexible hose or the like for easy connection. In addition, the outlet pipe 422 of the coolant circulation pump 420 may be formed to extend downward in the height direction.

Accordingly, in the coolant system according to the present invention, a distance between components constituting the coolant system for interior heating of the vehicle and cooling and heating of the electronic components is decreased, such that pressure loss of the coolant in pipes connecting the components to each other may be decreased, performance of the coolant system may be improved, and assemblability of the components constituting the coolant system may be improved.

In addition, in the reservoir tank 370 of the coolant system according to the present invention, a first fastening bracket 376 may be formed to extend from the left side surface of the body 370a in the length direction, and a second fastening bracket 377 may be formed to extend from a right side surface of the body 370a in the length direction. In this case, the first fastening bracket 376 and the second fastening bracket 377 may be formed integrally with the body 370a, and as illustrated in FIGS. 3 and 7, a separate bracket may be additionally coupled to the second fastening bracket 377. Therefore, the first fastening bracket 376, the second fastening bracket 377, and the third fastening bracket 378 are coupled to a vehicle body, such that the reservoir tank 370 may be firmly fixed.

In addition, the inlet pipe 371 of the reservoir tank 370 is connected to a coolant outlet of the radiator 310, such that the coolant discharged from the radiator 310 may be stored in the reservoir tank 370. In addition, the second outlet pipe 323 of the flow path switching valve 320 is connected to the battery 350, such that the coolant may cool or heat the battery 350 while passing through the battery 350. In addition, the outlet pipe 422 of the coolant circulation pump 420 may be connected to one or more of the water-cooled condenser 220, the heater core 440, and the electronic component 460. More specifically, referring to FIG. 1, the outlet pipe 422 of the coolant circulation pump 420 may be connected to the first directional selector valve 410 capable of controlling the flow direction of the coolant in four directions, and the coolant discharged from the coolant circulation pump 420 may sequentially pass through the water-cooled condenser 220, the first coolant pump 450, the coolant heater 430, the heater core 440, and the electronic component 460, and be then introduced into the radiator 310 according to an operation of the first directional selector valve 410. Alternatively, the coolant discharged from the coolant circulation pump 420 may directly pass through the electronic component 460 and be then introduced into the radiator 310 according to an operation of the first directional selector valve 410, and may not flow toward the water-cooled condenser 220, the first coolant pump 450, the coolant heater 430, and the heater core 440.

The present invention is not limited to the embodiments described above, and may be applied to various fields. In addition, the present invention may be variously modified by those skilled in the art to which the present invention pertains without departing from the gist of the present invention claimed in the claims.

DETAILED DESCRIPTION OF MAIN ELEMENTS

150: air conditioner, 151: temperature control door
152: blower
200: refrigerant system, 210: compressor
220: water-cooled condenser, 225: first expansion valve
230: air-cooled condenser, 233: refrigerant heat exchanger
240: second expansion valve, 242: evaporator
251: third expansion valve, 252: battery chiller
260: accumulator, 270: first connection block
300: coolant system, 301: heating line
302: cooling line, 302-1: first connection line
302-2: second connection line, 302-3: third connection line
310: radiator, 311: cooling fan
312: second coolant joint, 313: first coolant joint
320: flow path switching valve (second directional selector valve)
321: inlet pipe, 322: first outlet pipe
323: second outlet pipe, 325: first connection member
326: second connection member, 330: third directional selector valve
340: third coolant pump, 350: battery
370: reservoir tank, 370a: body
370b: protrusion part, 370c: stopper
371: inlet pipe, 372: outlet pipe
373: first fixing part, 374: second fixing part
376: first fastening bracket, 377: second fastening bracket
378: the third fastening bracket, 410: first directional selector valve
420: coolant circulation pump (second coolant pump)
421: inlet pipe, 422: outlet pipe
430: coolant heater, 440: heater core
450: first coolant pump, 460: electronic component

The invention claimed is:

1. A heat management system comprising:
a reservoir tank storing a coolant and replenishing a coolant line connected thereto with the coolant;

a flow path switching valve connected to a downstream side of the reservoir tank in a flow direction of the coolant and controlling the flow direction of the coolant;
a coolant circulation pump connected to a downstream side of the flow path switching valve in the flow direction of the coolant and pumping the coolant along the coolant line,
a first connection member connecting the coolant outlet of the reservoir tank and the coolant inlet of the flow path switching valve to each other; and
a second connection member connecting the one coolant outlet of the flow path switching valve and the coolant inlet of the coolant circulation pump to each other,
wherein each of the flow path switching valve and the coolant circulation pump is disposed below the reservoir tank in a height direction and is coupled to the reservoir tank,
wherein the flow path switching valve has one coolant inlet through which the coolant is introduced and two or more coolant outlets through which the coolant is discharged, and
a coolant outlet of the reservoir tank and a coolant inlet of the flow path switching valve are disposed adjacent to each other on the same line, and one coolant outlet of the flow path switching valve and a coolant inlet of the coolant circulation pump are disposed adjacent to each other on the same line.

2. The heat management system of claim 1, wherein a coolant outlet of the reservoir tank and a coolant inlet of the flow path switching valve are disposed adjacent to each other on the same line.

3. The heat management system of claim 1, wherein the flow path switching valve and the coolant circulation pump are disposed at heights corresponding to each other in the height direction, the flow path switching valve is disposed on a coolant inlet side of the coolant circulation pump, and a coolant outlet of the flow path switching valve and a coolant inlet of the coolant circulation pump are disposed adjacent to each other on the same line.

4. The heat management system of claim 1, wherein a coolant inlet of the reservoir tank is formed at an upper side of the reservoir tank in the height direction, and a coolant outlet of the reservoir tank is formed at a lower side of the reservoir tank in the height direction.

5. The heat management system of claim 1, wherein a coolant outlet of the coolant circulation pump is formed toward a lower side in the height direction.

6. The heat management system of claim 1, wherein the reservoir tank has a first fixing part and a second fixing part formed at one side thereof in a width direction, the first fixing part being coupled to the flow path switching valve and the second fixing part being coupled to the coolant circulation pump, and
the first fixing part and the second fixing part are formed on the same side surface of the reservoir tank.

7. The heat management system of claim 6, further comprising
a third fastening bracket coupled to the second fixing part of the reservoir tank,
wherein the coolant circulation pump is disposed and fixed between the second fixing part and the third fastening bracket.

8. The heat management system of claim 1, wherein the reservoir tank has a protrusion part formed downward from a lower surface of a body in which the coolant is stored and communicating with the body to accommodate the coolant, and has a coolant outlet formed from the protrusion part in a width direction, and
the flow path switching valve is disposed at a height corresponding to the protrusion part of the reservoir tank.

9. The heat management system of claim 1, further comprising
a first fastening bracket and a second fastening bracket formed to extend from both sides of the reservoir tank in a length direction and fixing the reservoir tank to a vehicle body.

10. The heat management system of claim 1, wherein the reservoir tank is connected to a downstream side of a radiator in the flow direction of the coolant.

11. The heat management system of claim 1, wherein the other coolant outlet of the flow path switching valve is connected to an upstream side of a battery side in the flow direction of the coolant.

12. The heat management system of claim 1, wherein a coolant outlet of the coolant circulation pump is connected to one or more of a water-cooled condenser, a heater core, and an electronic component.

13. A heat management system comprising:
a reservoir tank storing a coolant and replenishing a coolant line connected thereto with the coolant;
a flow path switching valve connected to a downstream side of the reservoir tank in a flow direction of the coolant and controlling the flow direction of the coolant; and
a coolant circulation pump connected to a downstream side of the flow path switching valve in the flow direction of the coolant and pumping the coolant along the coolant line,
wherein each of the flow path switching valve and the coolant circulation pump is disposed below the reservoir tank in a height direction and is coupled to the reservoir tank,
wherein the reservoir tank has a first fixing part and a second fixing part formed at one side thereof in a width direction, the first fixing part being coupled to the flow path switching valve and the second fixing part being coupled to the coolant circulation pump, and
the first fixing part and the second fixing part are formed on the same side surface of the reservoir tank.

14. A heat management system comprising:
a reservoir tank storing a coolant and replenishing a coolant line connected thereto with the coolant;
a flow path switching valve connected to a downstream side of the reservoir tank in a flow direction of the coolant and controlling the flow direction of the coolant; and
a coolant circulation pump connected to a downstream side of the flow path switching valve in the flow direction of the coolant and pumping the coolant along the coolant line,
wherein each of the flow path switching valve and the coolant circulation pump is disposed below the reservoir tank in a height direction and is coupled to the reservoir tank,
wherein the reservoir tank has a protrusion part formed downward from a lower surface of a body in which the coolant is stored and communicating with the body to accommodate the coolant, and has a coolant outlet formed from the protrusion part in a width direction, and the flow path switching valve is disposed at a height corresponding to the protrusion part of the reservoir tank.

15. A heat management system comprising:
- a reservoir tank storing a coolant and replenishing a coolant line connected thereto with the coolant;
- a flow path switching valve connected to a downstream side of the reservoir tank in a flow direction of the coolant and controlling the flow direction of the coolant;
- a coolant circulation pump connected to a downstream side of the flow path switching valve in the flow direction of the coolant and pumping the coolant along the coolant line, and
- a first fastening bracket and a second fastening bracket formed to extend from both sides of the reservoir tank in a length direction and fixing the reservoir tank to a vehicle body,
- wherein each of the flow path switching valve and the coolant circulation pump is disposed below the reservoir tank in a height direction and is coupled to the reservoir tank.

\* \* \* \* \*